United States Patent [19]

Worf

[11] 4,408,596

[45] Oct. 11, 1983

[54] HEAT EXCHANGE SYSTEM

[76] Inventor: Douglas L. Worf, 109 Perth Ct., Cary, N.C. 27511

[21] Appl. No.: 190,665

[22] Filed: Sep. 25, 1980

[51] Int. Cl.³ .................................................. F24J 3/02
[52] U.S. Cl. ................................. 126/428; 126/436; 126/431; 165/48 S
[58] Field of Search ............ 165/48 R, 45, 18, 48 S; 62/260; 126/400, 428, 436, 431

[56] References Cited

U.S. PATENT DOCUMENTS

| | | | |
|---|---|---|---|
| 3,254,702 | 6/1966 | Thomason | 165/48 S |
| 3,965,972 | 6/1976 | Petersen | 126/435 |
| 4,000,850 | 1/1977 | Diggs | 165/48 S |
| 4,197,993 | 4/1980 | Trombe et al. | 165/48 S |
| 4,254,822 | 3/1981 | Geier | 165/DIG. 2 |

FOREIGN PATENT DOCUMENTS 55-3568 1/1980 Japan .................................. 165/48 S

*Primary Examiner*—William R. Cline
*Assistant Examiner*—John F. McNally
*Attorney, Agent, or Firm*—Mills and Coats

[57] ABSTRACT

This invention is an energy efficient heating and cooling system. It is particularly adapted for use in conjunction with building type structures. Both liquid and gaseous fluids can be circulated at the same time through the heat exchange means. These exchangers can be either separately attached units or can form an integral part of the building structure itself. The exchangers are mounted on both northern and southern exposures and can accomplish a combination of functions either separately or at the same time to meet varying energy demand situations.

10 Claims, 4 Drawing Figures

HEAT EXCHANGE SYSTEM

FIELD OF INVENTION

This invention relates to comfort and energy control systems and more particularly to the heating and cooling of both liquid and gaseous fluids.

BACKGROUND OF INVENTION

In the past various systems have been developed in attempts to capture and utilize ambient energy sources. By far the most widely used systems of this type have been solar energy collectors which use either a liquid or a gaseous fluid as the transfer medium. These two mediums have not been used together, however, and certainly the prior art systems have left much to be desired as far as complete comfort control is concerned.

BRIEF DESCRIPTION OF INVENTION

After much research and study into the above-mentioned problems, the present invention has been developed to provide a means for utilizing both liquid and gaseous heat transfer mediums at the same time for collecting energy from ambient sources and, alternately, using both mediums to transfer energy from one to the other. Also the system of the present invention has provision for both heating and cooling with the exchanger portions of the system being either add-on type units or structurally integrated with the building itself.

In view of the above, it is an object of the present invention to provide heat exchange means using both liquid and gaseous fluids as heat transfer medium.

Another object of the present invention is to provide a plurality of heat exchange means in a building type structure for both heating and cooling purposes.

Another object of the present invention is to provide heat exchange means forming an integral part of a building structure.

Another object of the present invention is to provide a means for both heating and cooling an enclosure using ambient energy sources.

Another object of the present invention is to provide an improved heat exchanger which is inexpensive to construct, is highly efficient in operation, and can be used as an add-on or integral part of the structure with which it is associated.

Another object of the present invention is to provide a heat exchanger with a plurality of unconnected flue flow paths.

Other objects and advantages of the present invention will become apparent and obvious from a study of the following description and the accompanying drawings which are merely illustrative of such invention.

DETAILED DESCRIPTION OF INVENTION

With further reference to the drawings, the system of the present invention can be installed in conjunction with any suitable means such as a building structure indicated generally at 10. This structure includes a southern exposure roof 11, a southern exposure wall 12, a northern exposure roof 13, and a northern exposure wall 14. Although in the southern hemisphere, the northern exposure of the structure would be toward the sun, for the present purposes it will be presumed that the structure is located in the northern hemisphere with the southern exposure being the solar side.

Both the northern and southern exposure roofs and walls can include collector panels. These panels are of a special design to allow both liquid and gaseous transfer mediums to be used. Although three versions of these panels are disclosed in FIGS. 2 through 4, it should be noted that each includes the dual transfer feature.

Figure 2:
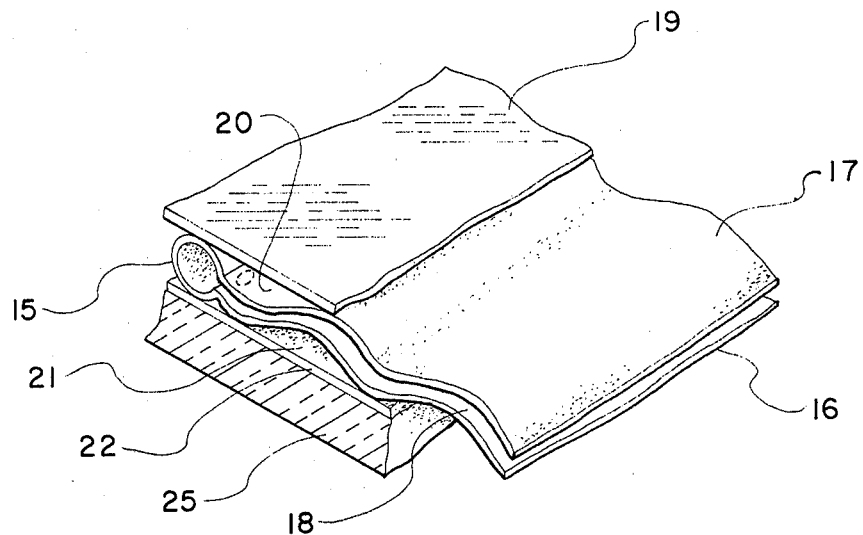
FIG. 2 is a cut-away end perspective view of a typical heat exchange panel.

The first version of the exchange panel is shown in FIG. 2 wherein an inlet manifold 15 is provided with spaced corrugated surfaces 16 and 17 connected thereto. The interior of manifold 15 communicates to the space 18 between the corrugated plates so that a liquid from the manifold can flow therebetween. The upper corrugated plate 16 can have a clear panel or sheet 19 lying juxtaposed to the ridges thereof so that upper horizontal channels 20 are formed. These channels can be either connected to a manifold so the fluid can pass therethrough or can be sealed in a static condition to act as an accumulator.

Lower horizontal channels 21 are formed by a bottom sheet 22 lying juxtaposed to the lower ridges of corrugated plate 17. Inlet manifold 23 allows the gaseous transfer fluid to be introduced into channels 21 and, if desired and so constructed, also into upper channels 20.

An edge outlet manifold 24 is provided at the end opposite manifold 23. This outlet manifold carries the gaseous heat transfer medium to storage or use areas such as a duct system 55 within structure 10. Since heating and air conditioning duct systems of this type are well known to those skilled in the art, further detailed description of the layout and operation of the same is not deemed necessary.

A layer of insulation 25 is provided behind bottom sheet 22 to prevent undesirable absorption of energy from the exchanger into the interior 26 of structure 10.

Figure 3:
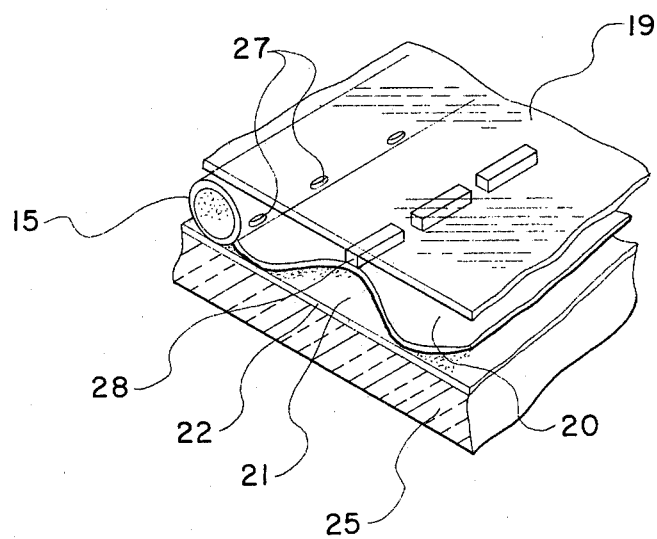
FIG. 3 is a cut-away end perspective of a modified exchange panel.

In the modified exchanger of FIG. 3, similar functioning parts will carry the same reference numbers as those used in the description of FIG. 2.

Referring now specifically to FIG. 3, the inlet manifold 15 has only a single corrugated plate 17 whose lower ridges lie in juxtaposed position to bottom sheet 22 thus forming horizontal channels 21. A plurality of orifices 27 open from the interior of inlet manifold 15 to the upper or outer surface of corrugated plate 17. Thus it can be seen that a liquid transfer medium can pass from inlet manifold 15 over the outer surface of plate 17.

A plurality of spacers 28 are periodically interposed between the upper ridges of plate 17 and transparent sheet 19. Gaseous transfer medium inlet and outlet manifolds 23 and 24 complete the modified exchanger which again can be used with both liquid and gaseous fluids.

Figure 4:
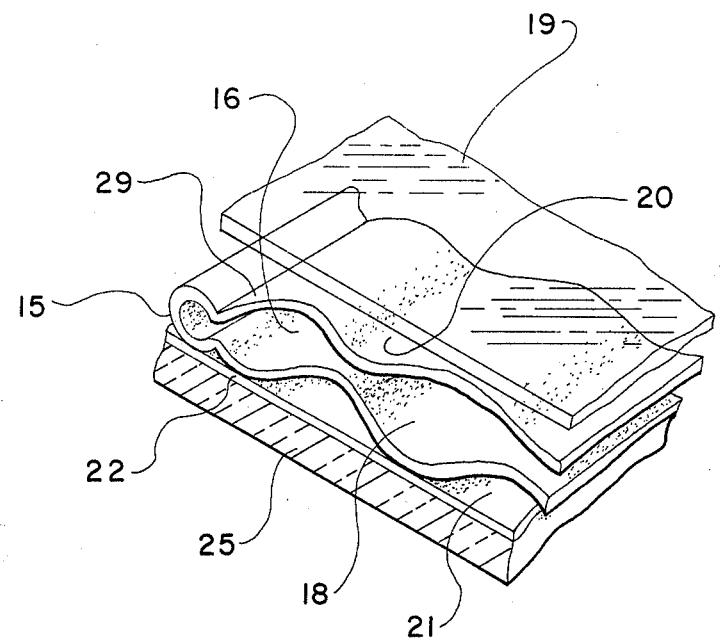
FIG. 4 is a cut-away end perspective view of a second modified exchange panel.

The exchanger disclosed in FIG. 4 also uses the same reference numbers for similar functioning parts as used in the description of FIGS. 2 and 3.

The primary difference between the form shown in FIG. 2 and in FIG. 4 is that reverse corrugations 29 are disposed with ridges lying juxtaposed to the ridges of corrugated plate 16 to form enlarged channels through which a gaseous transfer medium can flow. The main advantage of this is to provide greater fluid volume for transfer or absorption of heat or cool (as the case may be). Inlet manifold 15, edge manifolds 23 and 24 and insulation 25, along with the formed upper and lower horizontal channels 20 and a1 and liquid flow space 18 are all the same in this latter modification as shown in FIG. 2.

The providing of liquid tight seal between the corrugated surfaces of the heat exchangers in the areas adjacent the gaseous fluid manifolds 23 and 24 are considered well known to those skilled in the art and further detailed discussion of such seals is not deemed necessary.

Figure 1:
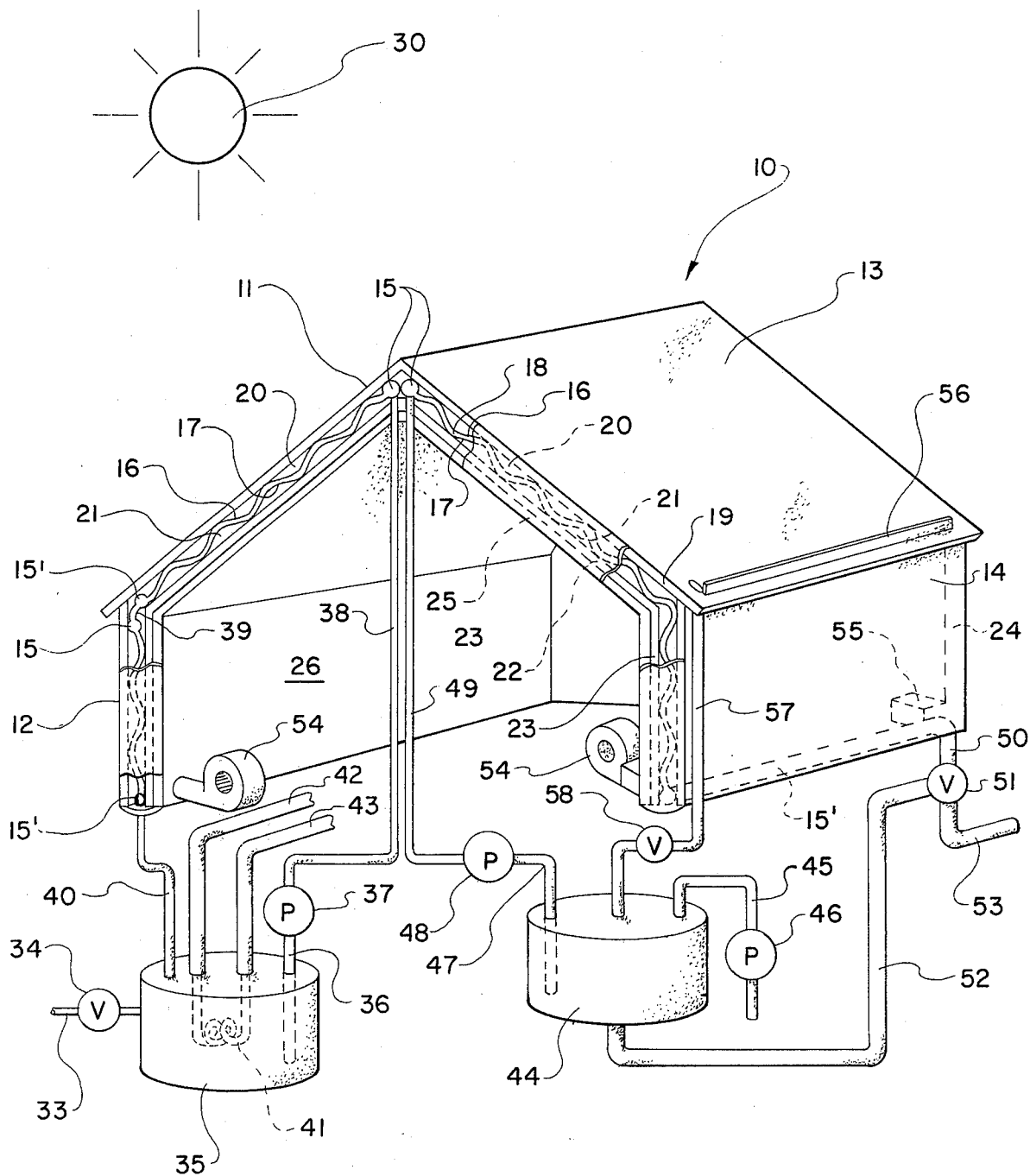
FIG. 1 is a perspective view in somewhat schematic form of the heat exchange system of the present invention.

With further detailed reference to FIG. 1, heat exchangers of the type hereinabove described are shown disposed on roof 11 and wall 12 and exposed to solar source 30. There are also exchangers provided on the nonsolar roof 13 and wall 14. Although either the roof or wall exchangers could be eliminated on either of the two exposures described, for the purposes of illustration, both roof and wall exchangers have been shown.

On the solar exposure, separate collectors are shown on both roof 11 and wall 12. These are shown as being interconnected at 39 although having selective separate inlet and outlet means could readily be provided.

On the nonsolar or northern exposure, a continuous heat exchanger is disclosed with manifold 15 being located at the peak of roof 113 and manifold 15' at the bottom of wall 14. A smaller or a plurality of exchangers could, of course, be substituted for the single layer exchanger. Also the exchangers on both the solar and non-solar exposures can be either add-on units for pre-existing structures or can form a part of the building structure itself.

Referring specifically to the liquid fluid system used in conjunction with the solar exposure of the present invention, a line 33 is communicatively connected to a liquid source (not shown) such as the municipal water system. Flow control valve 34 is provided for controlling the flow of liquid through line 33 into reservoir 35. An outlet line 36 runs from the bottom or cooler portion of reservoir 35 to pump 37. This pump can be of any suitable type since devices of this general type are well known to those skilled in the art. Manifold inlet line 38 runs from pump 37 to liquid fluid inlet manifold 15. The liquid forced by pump 37 into inlet manifold 15 will flow by gravity along the corrugated surfaces of the collector into liquid outlet manifold 15'. In the case of the collectors shown on the solar side of structure 10, the liquid would feed through connector 39 into the collector on wall 12 and from this collector's outlet manifold 15' into return line 40 which communicates with the interior of reservoir 35.

The above-referred to reservoir 35 can, of course, be used for heat storage and as such includes a heat exchanger 41 with inlet and outlet lines 42 and 43 operatively connected to the domestic hot water system (not shown) of the structure 10. This latter mentioned heat exchanger can also be used for interior heating through means such as baseboard hot water system if so desired.

Since baseboard heating and domestic hot water systems are well known to those skilled in the art, further detailed discussion of the same is not deemed necessary.

Although water has been indicated as the liquid fluid hereinabove described, it is, of course, to be understood that propylene glycol or other suitable heat transfer liquids can be substituted therefor.

The gaseous heat transfer means and the structure related thereto have not specifically been described in connection with the solar exposure heat exchanges, however, these systems are identical to that used for the nonsolar or northern exposure heat exchangers as hereinafter described in detail.

With specific reference to the nonsolar exposure of structure 10, a cool liquid reservoir 44 is provided with an inlet line 45 connecting such reservoir to a source of cool liquid such as a subterrain water source (not shown). A pump 46 is provided for controlling the flow of cool liquid through inlet line 45 into reservoir 44.

An outlet line 47 leads from the bottom or cooler portion of reservoir 44 to pump 48. Such pump is operatively connected to manifold inlet line 49 as seen clearly in FIG. 1.

Liquid pumped from reservoir 44 will flow by gravity through the corrugations of the heat exchanger of roof 13 and wall 14 and will be accumulated in outlet manifold 15' which is connected to outlet line 50. This line goes into valve 51 which selectively allows liquid to be routed either back into reservoir 44 through line 52 or into ambient discharge line 53. Thus it can be seen that when the exchanger or exchangers on the shaded exposure of structure 10 are used for interior cooling of the structure 10, the liquid transfer medium would collect heat and be discharged from ambient line 53. On the other hand when such liquid is used to collect cool temperatures, it will be returned to cool liquid reservoir 44.

The dual heat transfer medium feature of the present invention is clearly shown in conjunction with the non-solar exposure of structure 10 and includes a blower 54 or other suitable means operatively connected to inlet manifold 23. This manifold communicates into channels 20 and 21 so that the air can be moved through the exchanger to outlet manifold 24. This latter mentioned manifold is operatively connected to the normal heating and cooling duct system 55 of structure 10.

Blower 54 is shown for illustration purposes only and could, of course, be located anywhere in the duct system so long as the gaseous heat transfer fluid is caused to move from manifold 23, through channels 20 and 21, into manifold 24, and back into the duct system.

Since rain water is cooled by the upper atmosphere and usually reaches the earth in a cooled state, a gutter 56 is provided on roof 13 which drains into line 57 and through control valve 58 into reservoir 44. Although not specifically shown, a temperature sensing means could be provided adjacent the surface of roof 13 so that when rain water of a predetermined low temperature is falling thereon, valve 58 would automatically open allowing the cool water to flow into reservoir 44.

In use of the system of the present invention, reservoir 35 is filled with water or other liquid from line 23 through valve 34. To heat the liquid contained within this reservoir, pump 37 is activated so that liquid moves through lines 36 and 38 into manifold 15 of the heat exchanger disposed on solar exposure roof 11. The liquid then moves down the corrugations of the exchanger to manifold 15' and during the process becomes heated by sun 30. The liquid then either goes through the second heat exchanger 12 as shown in FIG. 1 or goes directly to return line 40 and thus back into reservoir 35.

Domestic hot water or hot water heating means can be operatively connected to lines 42 and 43 and through heat exchanger 41 can obtain the heat necessary for appropriate operation.

During cooler weather but when the sun 30 is shining adequately enough to heat the liquid passing through heat exchangers on roof 11 and/or wall 12, gaseous fluid can be circulated through channels 20 and 21 and into the duct system 55 of the structure 10 to heat such structure. Thus the dual effect of storing heat in a liquid medium and at the same time heating the interior of the structure through use of a gaseous medium can be accomplished.

The nonsolar exposure heat exchangers operatively mounted on roof 13 and/or wall 14 operate separately from the solar exposure systems and are adapted to cool one or both of the heat transfer mediums used in conjunction therewith. By way of further explanation, during warm weather when heat is being stored in reservoir 35, the cool liquid stored in reservoir 44 can be pumped through lines 49 by pump 48 to cool the corrugated plates of the nonsolar heat exchangers. Gaseous air can at the same time be forced by blower 54 through these nonsolar heat exchangers picking up coolness from the liquid portion of exchangers thus introducing cool air into the duct system 55 of structure 10 to cool the same. Valve 51 would preferably be opened to ambient discharge line 53 and the liquid would be replaced by pump 46 pumping cool subterrain water into reservoir 44 through lines 46.

During rain showers liquid can also be introduced into reservoir 44 through line 57 by opening valve 58 to allow the water collected from gutter 56 to pass therethrough.

During cool nighttime periods, valve 51 can be operated to allow the circulating liquid heat transfer medium to pass through lines 52 back to reservoir 44 so that as such liquid is circulated to the heat exchangers, heat will be given off and cool liquid returned to reservoir 44. During the following daytime hours, the process can be continued with the warm water being discharged through lines 53 to cool the interior of the structure 10.

From the above it can be seen that two entirely separate systems are provided for structure 10, one for the solar exposure and one for the nonsolar exposure. The heat exchangers themselves are dual capacity in that both liquid and gaseous heat transfer mediums can be used simultaneously therewith. Thus both heat and cool storage systems are provided as well as means for withdrawing the same to selectively heat or cool the interior of the structure. Further a provision for heating domestic hot water is provided in conjunction with the solar exposure system.

Although line 53 has been indicated as being an ambient discharge line, it, of course, could be connected to reservoir 35 through connection to inlet 33 thus presenting warm water thereinto.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

What is claimed is:

1. An improved solar energy heating and cooling system comprising: a structure having a solar exposure and a nonsolar exposure; first heat exchange means mounted on said solar exposure of said structure for collecting solar energy and transferring the collected solar energy in the form of heat into said structure for heating the same, said first heat exchange means including solar energy collecting and transferring means provided with two adjacent but separate and distinct fluid flow paths with each fluid flow path being adapted to receive and channel a particular fluid medium therethrough; said first heat exchange means further including means for directing a first fluid medium through one fluid flow path of said solar energy collecting and transferring means and a second fluid medium through the other fluid flow path of said solar energy collecting and transferring means, and wherein said fluid flow paths of said solar energy collecting and transferring means are disposed such that energy in the form of heat can be readily transferred from one passing fluid medium to the other passing fluid medium; second heat exchange means mounted on said nonsolar exposure of said structure for cooling said structure and including an energy collecting and transfer means provided with two adjacent but separate and distinct fluid flow paths; said second heat exchange means further including means for directing a first fluid medium through one fluid flow path of said energy collecting and transfer means and a second fluid medium through the other fluid flow path of said energy collecting and transfer means, and wherein said fluid flow paths of said energy collecting and transfer means are disposed adjacent each other in side-by-side relationship such that energy in the form of heat can be readily transferred from one passing fluid medium to the other passing fluid medium such that energy in the form of heat may be selectively extracted from said structure so as to cool the same, whereby said first solar exposure heat exchange means can be used to both collect solar energy and use the same to heat the interior of said structure while said second nonsolar exposure heat exchange means can be utilized to effectively cool the structure.

2. The system of claim 1 wherein said liquid fluid transfer medium of said first heat exchange means is water.

3. The system of claim 1 wherein the liquid fluid transfer medium of said first heat exchange means is propylene glycol.

4. The system of claim 1 wherein a means is provided for storing the heat accumulated by the first solar exposure heat exchange means.

5. The system of claim 1 wherein at least one of the fluid mediums used in conjunction with the first solar exposure heat exchange means is a gaseous fluid transfer medium.

6. The system of claim 5 wherein the gaseous fluid transfer medium is air.

7. The system of claim 1 wherein said liquid fluid transfer medium of said second heat exchange means is subterrain water.

8. The system of claim 1 wherein at least one of the fluid mediums is used in conjunction with the nonsolar exposure heat exchange means is a gaseous fluid transfer medium.

9. The system of claim 8 wherein the gaseous fluid transfer medium is air.

10. The system of claim 1 wherein one of said fluid mediums of said second heat transfer means is cooled and there is provided means for storing the cooled fluid transfer medium.

* * * * *